United States Patent [19]
Poncet

[11] Patent Number: 5,540,900
[45] Date of Patent: Jul. 30, 1996

[54] REACTORS AND APPARATUS FOR THE PHYSICO-CHEMICAL TREATMENTS OF SUBSTANCES IN THE SOLID, LIQUID OR GASEOUS STATE

[76] Inventor: Pierre J. Poncet, 54 Rue Professeur Florence, Lyon, France, 69003

[21] Appl. No.: 270,672

[22] Filed: Jul. 5, 1994

[30] Foreign Application Priority Data

Jul. 6, 1993 [FR] France ................................ 93 08536

[51] Int. Cl.$^6$ ......................................... B01F 7/08
[52] U.S. Cl. ......................... 422/225; 422/224; 422/229; 366/83; 366/84; 366/89; 366/91; 366/301; 366/323
[58] Field of Search ................................. 366/79, 83–86, 366/89, 91, 96, 97, 297, 301, 323; 422/224, 225, 229, 131, 134, 135, 137

[56] References Cited

U.S. PATENT DOCUMENTS

| | | | |
|---|---|---|---|
| 2,836,851 | 9/1955 | Holt | 96/66 |
| 3,572,644 | 3/1971 | Poncet | 366/84 |
| 3,602,484 | 8/1971 | Poncet | 366/84 |
| 3,687,288 | 8/1972 | Lynch et al. | 366/14.2 |
| 3,698,693 | 10/1972 | Poncet | 366/301 |
| 3,738,409 | 6/1973 | Skidmore | 159/2.2 |
| 3,940,220 | 2/1976 | D'Arcangeli | 264/102 |
| 4,534,652 | 8/1985 | Stade | 366/85 |

*Primary Examiner*—Robert J. Warden
*Assistant Examiner*—Hien Tran
*Attorney, Agent, or Firm*—Dowell & Dowell

[57] ABSTRACT

An apparatus for the physiochemical treatment and reaction of material which includes a pair of conveying screws which convey the material from an inlet to an outlet and wherein the portion of the material is recycled through spaced openings between the screws and wherein the material is introduced from one screw to the other screw in such a manner that an air space is created between the threads of the other screw so that air may be provided to or taken from the material being conveyed.

17 Claims, 5 Drawing Sheets

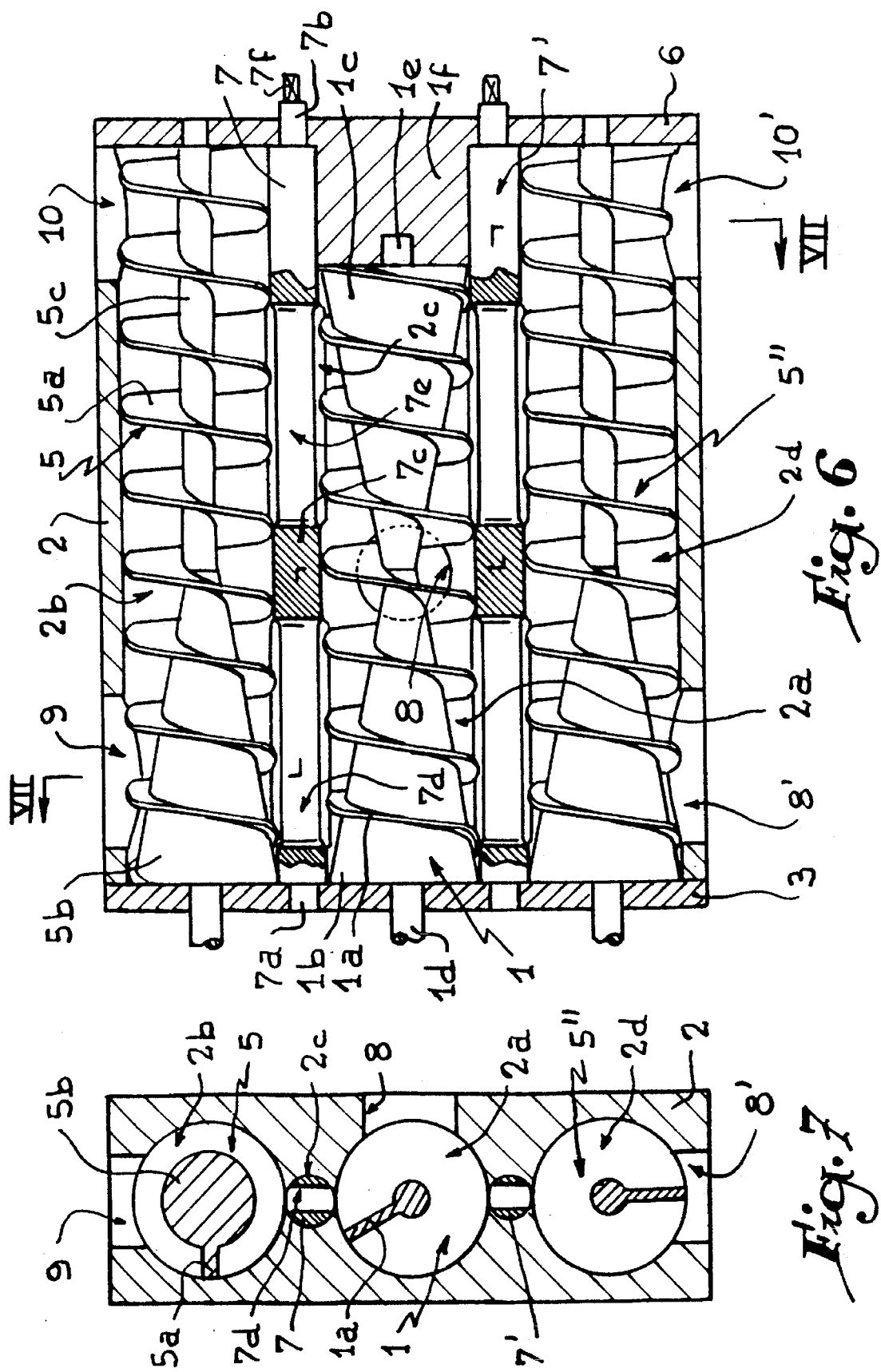

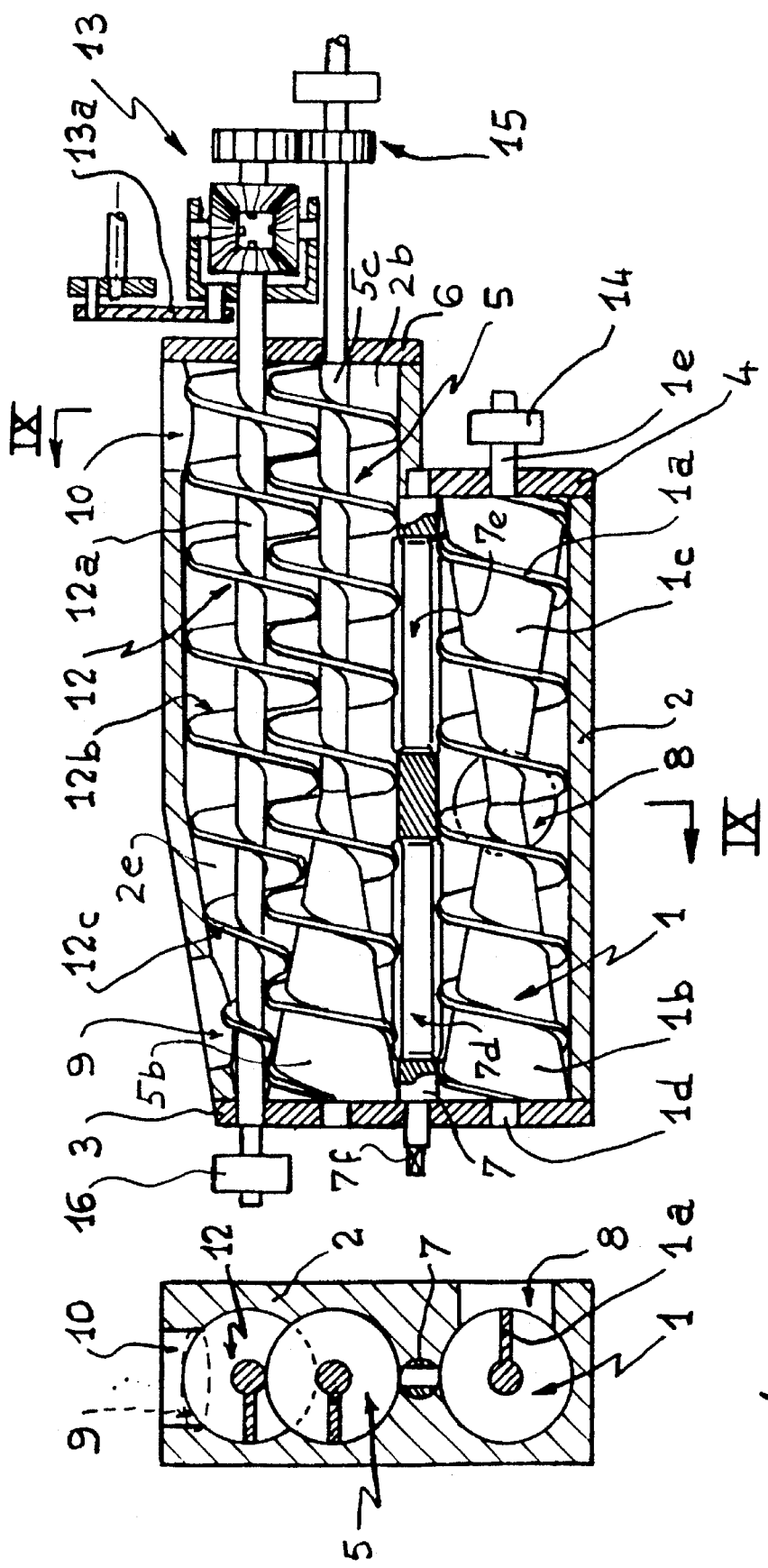

5,540,900

REACTORS AND APPARATUS FOR THE PHYSICO-CHEMICAL TREATMENTS OF SUBSTANCES IN THE SOLID, LIQUID OR GASEOUS STATE

BACKGROUND OF THE INVENTION

1. Field of the Invention

The present invention relates to improvements in reactors and apparatus for the physicochemical treatment of substances in the solid, liquid or gaseous state.

2. History of the Related Art

Chemical or physicochemical phenomena occur at the interfaces of substances, i.e., at the contact surfaces of small agglomerates of solids, liquids or gases. It is also at the contact surfaces where forces of surface tension develop to generate molecular adsorption and desorption and where the dissolution of gases or their emergence and the dissolution or separation of liquids and solids from one another occur. The area of the contact surfaces is also where heat is exchanged and where pellicular sealing forces originate.

Consequently, the present invention is directed to apparatus adapted to create a high level of activation at the interfaces of substances by the non-turbulent division and reconstitution of such substances.

French Patent No. 1 562 004 describes an apparatus for making homogeneous mixtures from a plurality of substances in the pasty, pulverulent or fibrous state. The apparatus includes two screws with truncated cores which flare outwardly in the direction of their free ends which are placed in two adjacent bores which are communicated via longitudinal passages. The working volume in which matter is conveyed thus increases and decreases, in the same way, along each bore. The matter passes from one bore to the other, being methodically divided and recollated as it leaves one volume and occupies another of the same volume without being compressed or depressed. The screws cause the matter to move in the direction of the arrows shown in FIG. 3 of the Patent so that the matter arrives via orifice A and leaves via orifice B. This action of the screws produces a rapid creation of the solid and liquid interfaces in the constant volume created in the reactor.

Experience has shown that this structure hinders creation in liquid-gas and solid-gas interfaces and does not form, during operation, a free space which is large enough to allow dissolution or separation of gases from the reactor medium. This considerably limits the uses of such an apparatus. In fact, the production and management of the chemical reactions require that the gaseous phases also be controlled.

It is an object of the improvements of the present invention to overcome these drawbacks.

SUMMARY OF THE INVENTION

To that end, in order to produce an apparatus capable of better controlling these gaseous phases and the generation or creation of the solid-gas and liquid-gas interfaces, the present invention provides an apparatus intended for the physicochemical treatment and reaction of substances in the solid, liquid and/or gaseous state. The apparatus includes a sleeve provided with at least two bores: in each of which is disposed a screw. The screws communicate with one another over a portion of their length via appropriate passages thereby allowing a circulation of the mixed substances from one bore to the other. At least one of the screws is provided with means for creating, in operation, an additional free volume or space thereby allowing the introduction or extraction of gas during treatment.

In the following specification the term "matter" designates substances in a state where the solids and liquids dominate and the terms "empty volume" or "empty space" designate a gaseous medium.

BRIEF DESCRIPTION OF THE DRAWINGS

The invention will be more readily understood on reading the following description with reference to the accompanying drawings, in which:

FIG. 6 is a longitudinal section through an apparatus in accordance with another embodiment.

FIG. 7 is a section along VII—VII (FIG. 6).

FIG. 8 is a longitudinal section of another embodiment of FIG. 1.

FIG. 9 is a section along IX—IX (FIG. 8).

DESCRIPTION OF PREFERRED EMBODIMENTS

With a view to simplifying the following description, the conical cores of each of the screws described are represented with a constant angle along this axes, which produces a regular outlet of the matter along the generatrices defined by the outlet rotation. Such outlet may, of course, be changed by varying the inclinations of these conical cores along the geometrical axes of the screws.

Figure 1:
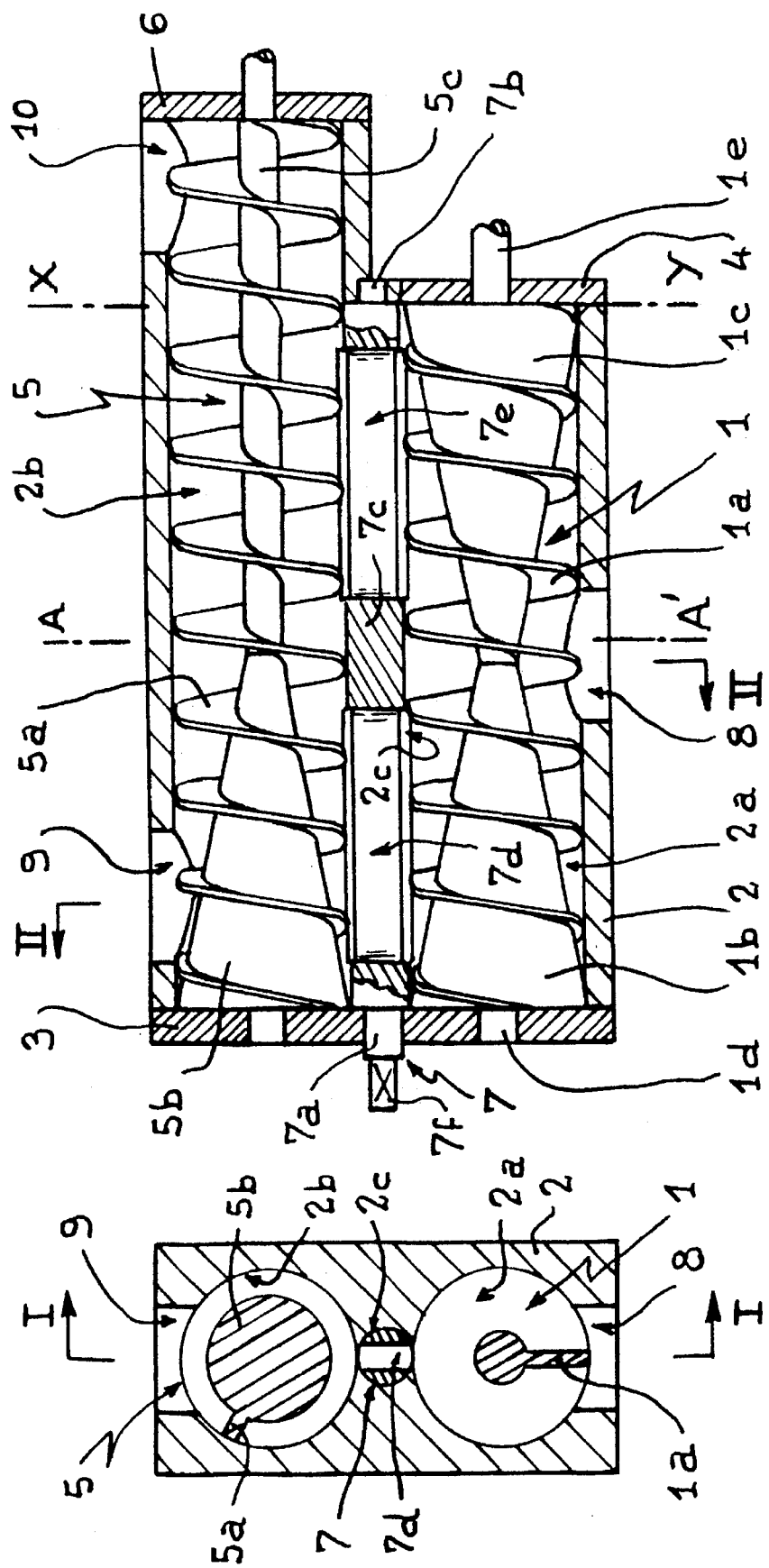
FIG. 1 is a longitudinal section through an apparatus incorporating the improvements according to the invention.

Referring now to the drawings, the apparatus according to a first embodiment of the invention, as illustrated in FIG. 1, comprises a first screw 1, of which the thread 1a cooperates with a first bore or space 2a of a sleeve 2. The core of the screw is biconical, i.e., it comprises two conical parts joined at their apices, the two parts of the core being respectively referenced 1b and 1c. The core is centered by shafts 1d, 1e journalled in plates 3 and 4, respectively. Shaft 1e is suitably driven in rotation by any means (not shown).

Figure 2:
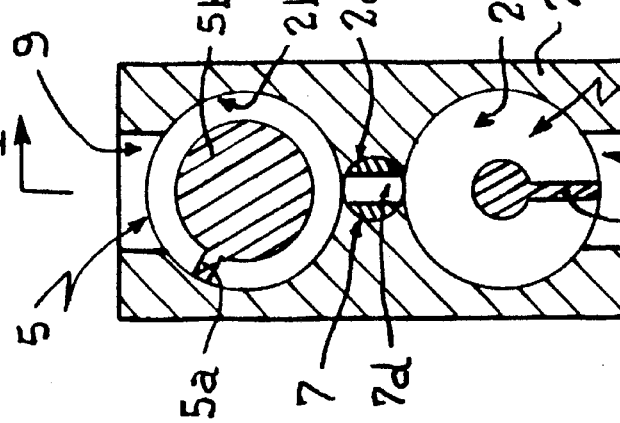
FIG. 2 is a section along II—II (FIG. 1). I—I indicates the plane of section of FIG. 1.

The second part of the apparatus is constituted by a screw 5 whose thread 5a cooperates with a second bore or space 2b which is parallel to the first bore, 2a, in the sleeve 2, as illustrated in FIG. 2.

Screw 5 comprises a cylindrical-conical bore core (5c–5b) whose large diameter is at one of the ends. The diameter of this core decreases along part 5b of the screw to a minimum which remains constant to the end of the screw, as shown at 5c.

It is observed that screw 1 is of length which is shorter than that of screw 5, with the result that the cylindrical part 5c of the core of screw 5 has a length longer than that of part 1c of the core of screw 1. The essential reason for such increase in length is to enable the apparatus and vacuum-producing unit to be connected by a large lateral section to allow a better circulation of gases. This arrangement has no influence in the explanation concerning the working principle of the invention. Bore 2b is closed at its two ends by plates 3 and 6.

Sleeve 2 is provided with a longitudinal bore 2c which intersects with bores 2a and 2b over their length. Of course, the longitudinal geometrical axis of the bore 2c is parallel to those of the bores 2a, 2b.

In bore 2c is a valve element 7 having two ends 7a, 7b and a median portion 7c. Between its ends, the valve element has two slots 7d, 7e which form passages for communication of bores 2a and 2b. Outside plate 3, the valve 7 has a head 7f enabling it to be rotated to vary the opening of the passages between the two bores.

In another embodiment (not shown), the valve element 7 includes two separate slots 7d, 7e which may be actuated separately. This arrangement makes it possible better to control the circulation of matter.

The valve element 7 may be eliminated and the parallel cylindrical bores 2a, 2b may communicate directly via a continuous slot, as is known in the art.

In the median portion of the sleeve 2 is an inlet 8 for introduction of matter to be treated. The inlet 8 opens in the median part of the screw 1. An outlet 9 is also provided for matter disposed at the part 5b of the core of the screw 5. At the opposite end of bore 2b from the outlet 9 is a passage or orifice 10 for the extraction or introduction of gas.

In the following, it will be assumed that the length of core 5c is equal to the length of core 1c with bore 2b ending along a line X–Y passing through plate 4.

Figure 3:
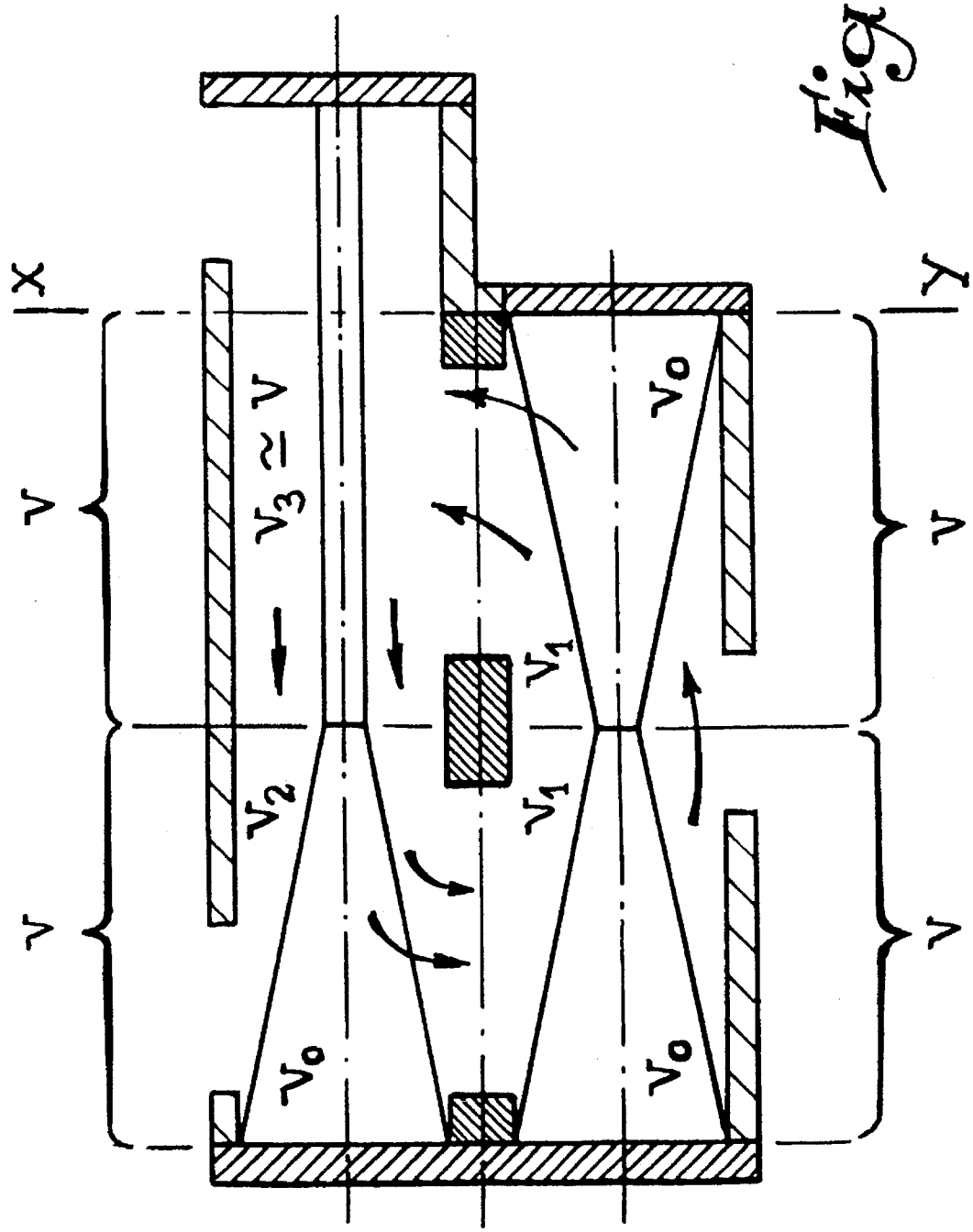
FIG. 3 is a section schematically illustrating the circulation of matter in the apparatus according to the invention.

Each of the two cylindrical spaces 2a and 2b occupies the same volume equal to 2V. The total volume of the two spaces of bores 2a or 2b is equal to 2V+2V=4V (FIG. 3).

In the example chosen, the three conical cores have the same constant angle along the screws, with the result that they each generate a volume $V_0=V/3$.

Under these conditions, in bore 2a, the volumes corresponding to the space around the conical cores and which is $V_1$ have a value $V_1=V-V/3=2V/3$.

The space around part 5b of the core of screw 5 is $V_2$ while that around the cylindrical part 5c of the core of screw 5 is $V_3$. For reasons of simplicity, volume $V_3$ will be estimated as being equal to V, i.e., to the total half-volume of the space or bore 2b, with the volume $V_2$ equal to $V_1$. Therefore $V_3=V$ and $V_1=V_2=2V/3$.

The total useful volume of the reactor is therefore $2V_1+V_2+V_3$ or, relating to V: $2V/3+2V/3+2V/3+3V/3=9V/3=3V$.

The quantity of matter in a reactional cycle is included between 6V/3 and 8V/3, leaving free, in space 2b, a volume of about V/3.

In space 2b, the used section must also be maximized. This is achieved by the cylindrical structure and the small diameter of the core of the screw 5c.

The volume $V_3=V$ located around the cylindrical part 5c thus has a constant maximum annular section to orifice 10.

This considerable annular section, like that of the orifice 10, is indispensable, particularly to allow work under reduced pressure. This requires that the pressure drop be very slight in the working enclosure, and in any possible condensers and vacuum-generator units located downstream of the reactor.

The large section of the orifice 10 is obtained because of the length of the bore 2b which is greater than that of bore 2a.

The matter circulates in the direction of the arrows shown in FIG. 3. The driving forces are present in the open spaces of the apparatus without dead space.

It should be noted that depending on the conditions of use of the reactor, plate 6 and the bearing of the screw 5 may be eliminated. It is then possible to connect this end of bore 2b directly to a vacuum generator unit.

The elongation of bore 2b makes it possible to form a large connecting section which may be reduced. This is the case, for example, when the introduction or extraction of a gas is effected under pressure.

As the machine is in operation, the circulating matter can occupy only a part of the space or bore 2b between the plane A, A' passing through the apex of the truncated parts of the two screws and the plane X–Y containing the plate 4, while the other three volumes are filled without exerting a major stress on the matter.

At each rotation of the screw 1, the volume of matter equal to 2/3V is introduced in the space or bore 2b along the opening created by the bore which connects the bores 2a and 2b.

At the same time, the screw 5 collects and evacuates in 2a the same volume 2/3V that it received from screw 1. This produces in space 2b a volume V–2/3V=V/3 which is not filled with matter in which a determined gaseous pressure prevails.

This behavior of the matter moving in space 2b is unique by reason of the generation of an open volume V/3 due to the cylindrical-conical shape of the core of the screw 5 and which is generated upon each revolution of the screws.

During recollation of the matter in 2b whose open space is the greatest by reason of the dimension and cylindrical shape of the core of screw 5, the gaseous phase intervenes directly with the liquid and solid phases and participates actively in the generation, composition and creation of the gas-liquid and gas-solid interfaces.

Experience has shown that the course of the reaction may change the real free volume prevailing in the space 2b. This is a very important parameter which must be known. It is always useful to measure it. This is indispensable in the case of a continuous operation.

Thus, the apparatus according to the invention illustrated in FIG. 1 continuously activates the creation of the interfaces in all the successive phases of the operational cycle. However, it is in the space around the cylindrical part 5c of the core of the screw 5 that, by reason of the open volume, the liquid-gas and solid-gas interfaces develop and modify to a maximum. Also, there is a rapid separation of the gases which are dissolved or adsorbed including those which result from the reactions.

Similarly, when a gas under pressure is supplied via passage 10, this same regeneration or creation of interfaces accelerates the dissolutions and reactions of gas during the process.

Figure 4:
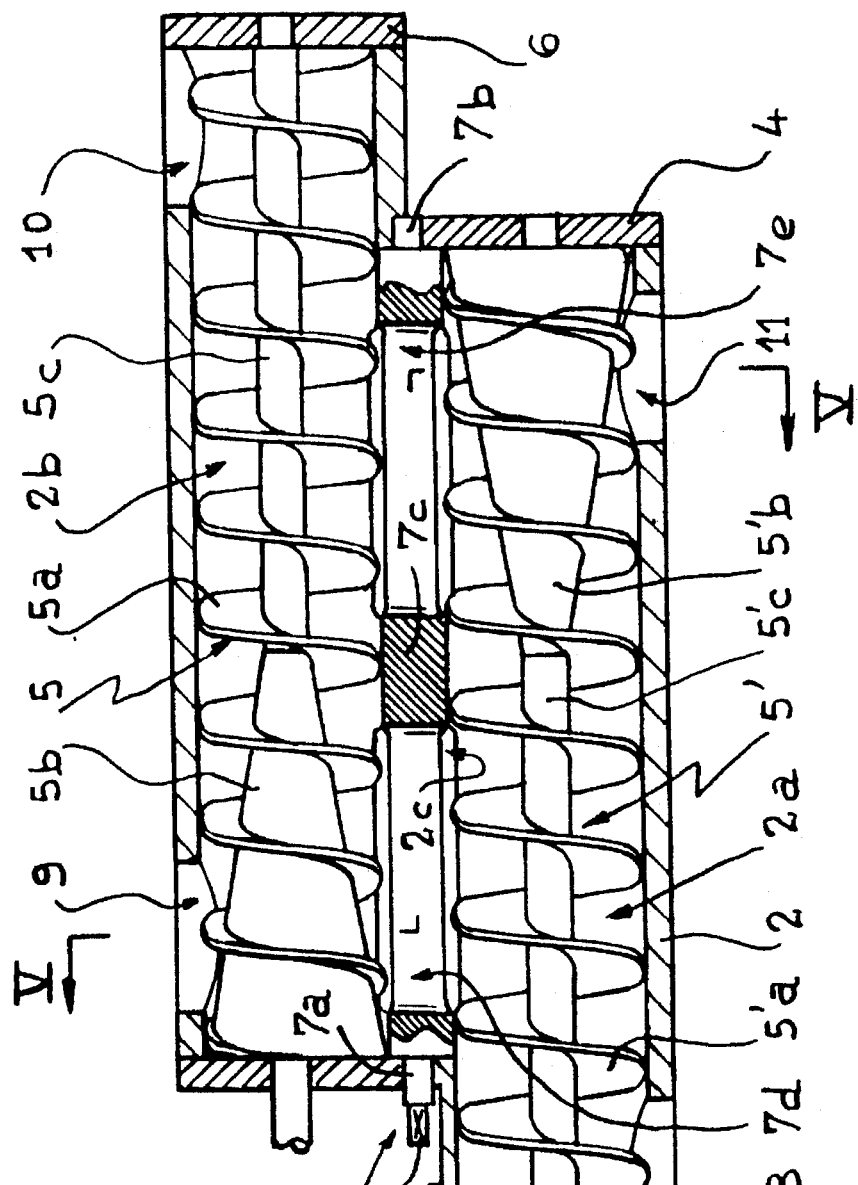
FIG. 4 is a section similar to that of FIG. 1, but illustrating a different embodiment.
Figure 5:
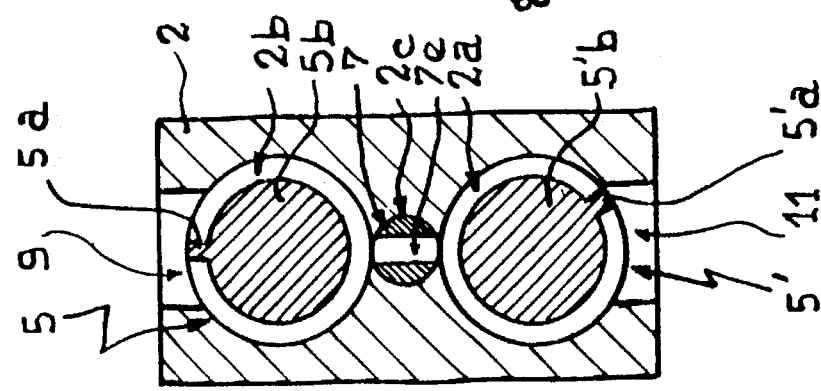
FIG. 5 is a section along V—V (FIG. 4).

As illustrated in FIGS. 4 and 5, the biconical screw 1 of FIG. 1 is replaced by a cylindrical-conical screw 5' which is offset axially with respect to screw 5 so as to create a passage of large volume for the circulation of gases. In this case, the two cylindrical portions of the cores of the screws are opposite one another.

The operation of such a reactor is substantially identical to that of the apparatus illustrated in FIG. 1. The only difference resides in that there are two open spaces 2a, 2b instead of one 2b of FIG. 1. This assembly is therefore of interest, particularly when the gaseous volumes are considerable. It is possible to double the additional free space for the introduction or extraction of the gas in the course of treatment. It will be observed that the inlet 8 is at the end of the cylindrical part of the screw 5' and that an outlet passage 11 is made in the sleeve at the larger diameter of the conical part of the screw.

FIG. 6 illustrates a variation of the apparatus illustrated in FIG. 1, wherein a second screw 5", identical to screw 5, has been joined to screw 1 symmetrically with respect to screw 5, in a bore 2d communicating with bore 2a by a valve element 7' similar to valve element 7. This structure brings about several modifications.

Firstly, screw 1 is mounted in an enlarged plate if which compensates for the difference in length of screw 1 with respect to screws 5 and 5". In addition, a second passage or orifice 10' which is larger than orifice 10 is provided which is necessary for use under very low pressure. Orifices 10 and 10' may also be located at the end of screws 5 and 5", as in the embodiment of FIG. 1.

In this embodiment, inlet 8 for the matter to be treated is located lateral of screw 1. Also, bore 2b need not include an outlet for matter, this being transferred in bore 2d to 8', or vice versa.

It will be understood that the second valve element 7' placed between screws 1 and 5" allows circulation of matter between the different bores.

In this embodiment, valve element 7' also comprises bearing surfaces between which are located slots defining passages for matter, as in the case of valve element 7'.

Similarly, valve elements 7 and 7', may each be made in two parts which makes it possible to better control the work of the materials in 1she course of the work cycle.

FIG. 8 illustrates an apparatus in which the embodiment of FIG. 1 is supplemented by a screw 12 rotating in synchronism with screw 5, but being capable of being phase-shifted by a variable angle during rotation. Screw 12 is provided with a cylindrical core 12a associated with a thread comprising a part 12b with cylindrical periphery whose length corresponds to that of the core 5c of screw 5 and a second part 12c whose periphery is conical. The shape of part 12c corresponds to that of conical part 5b of the: core of the screw 5. The sleeve is given the corresponding shape in order to define a specific bore 2e for the screw 12.

The large empty volume which exists in space 2b or 2e during operation is ensured by the configuration of the cores 5c, 12c which are cylindrical, the profile and pitch of the threads, and the alternate phase-shift of screws 5 and 12 caused by a differential or phase-shifter 13.

The width of the threads of screws 5 and 12 is much smaller than the width of the hollow which separates two consecutive threads. This configuration leaves a large free space between the thread sides of the screws (while ensuring a cleaning of all the volume during rotation of the screws). Screws 5 and 12 rotate at the same speed. Their relative angular position is adjustable between limits by the differential or phase-shifter 13. Rotation of the screws is ensured by the differential 13 which controls the phase-shift of the two screws. The phase-shift is permanently measured and modified in accordance with a program chosen as a function of the application of the reactor.

Modification of the angle of phase-shift moves apart two contiguous thread sides and at the same time brings closer the two adjacent thread sides. The maximum angular phase shift corresponds to the extreme positions of contacts of the thread sides.

If D is the maximum phase-shift angle and $D_0$ half the angle D, when the phase-shift is $D_0$, the sides of the threads of screws 5 and 12 are equidistant. Therefore, at phase-shift $+D_0$, the sides of threads touch and at phase-shift $-D_0$, the opposite sides touch.

For a constant phase-shift $D_0$, and screws 5 and 12 being in rotation, both function in the same way as screw 5 of the apparatus of FIG. 1.

On the other hand, when the phase-shift angle evolves between values $+D_0$ and $-D_0$, different results are produced by this arrangement of FIG. 8. Screws 5 and 12 in this case develop, in opposite directions, on either side of their thread sides, two volumes of which the sum is constant. Therefore, at each rotation, one of the volumes increases while the other decreases. This process produces two novel effects between the threads of the screws. On the one hand, an increasing volume promotes the maximum section necessary for the development of the gas-liquid or gas-solid interfaces and the circulation of the gases under molecular vacuum. On the other hand, a decreasing volume distributes the solid and liquid matter in the adjacent spaces or volumes and constitutes an important factor of development of these interfaces with gaseous components. It also prevents any possible stagnation of matter inside the reactor and between the sides of the screws.

According to the invention, the structures shown in FIGS. 8 and 9 provoke and govern, as soon as the reactor is set into operation, the movements of the matter and generate the spaces or volumes partially occupied by the gases. In the spaces are produced and developed particular solid-gas and liquid-gas interfaces.

To that end, the reactor methodically distributes the matter at regular speed, without compression or depression in space V3 (FIG. 3) where recollation is effected at the same time as the empty volume is generated, which is a characteristic of the process according to the invention. It is in this part of the apparatus that the screws 5 and 12, subjected to a variable phase-shift controlled as a function of the characteristics of the reaction, are located.

Rotation of screws 5 and 12 entrains the matter, causing an axial thrust force which is measured on the screw supporting bearings by strain gauges or other means schematized at 14, 15, and 16. This axial force is designated by FA while the corresponding torque is referenced CR O.

The angle of phase difference of the screws is maintained by the differential or phase-shifter 13 on which is applied a force of adjustment of the angle of phase difference of screws 5 and 12 which is designated by CD. This force is applied for example by means of a small rod 13a which engages the cage of the differential and is driven by a crank pin.

Therefore, if the case of V3 not containing matter is considered, the possible angle of phase difference before contact of the sides of the threads of the screws 5 and 12 in each direction is maximum, this difference will be designated by Dmax. If the phase-shifter 13 is regulated to an angle DO=Dmax/2, in this position, the sides of the threads 5 and 12 are equidistant. In this instance, a quantity of matter introduced in the apparatus in inlet 8 generates during operation of the reactor, in space V3, a gaseous volume V/3 equal to the volume occupied by the solid and liquid matter. In this instance, CD designates the force applied to the phase-shifter 13 to vary the angle of phase difference of the screws via the small rod 13a and FA designates the axial propulsion thrust force of the matter exerted and measured on each bearing of screws 5 and 12.

In this state, with the differential or phase-shifter 13 being adjusted to DO, the forces developed to drive screws 5 and 12 are minimum [(CD)O and (FA)O respectively].

By modifying the angular state DO, the sides of the threads of screws 5 and 12 are brought into contact via the solid and liquid matters.

As soon as such contact is produced, (CD)0 increases and becomes (CD)1. To this increase there is created on screws 5 and 12 axial forces of phase-shift of opposite direction (FAD)1 measured on the bearings of screws by known means constituted for example by the strain gauges 14, 15, and 16 mentioned above. Knowledge of the angle of phase difference ΔD=D1 is therefore possible at any moment by measuring the axial force (FAD)1.

It is thus possible to continuously regulate the development of the reaction underway, the variation of the free gaseous volume, and consequently to control the inlets and outlets of matter to and from the reactor.

It will be noted that when the maximum angle of phase difference is attained, the forces applied to the phase-shifter 13 and the axial forces FA measured on the drive bearings of the screws 5 and 12 are maximum. This observation leads to new applications.

By way of example, the process described hereinabove makes it possible to develop and control the force applied on matter between the sides of threads during the reactional treatment. The matter may also be subjected to programmed efforts, micro-grindings and original mechanical surface treatments in the reactor.

Of course, the self-cleaning structure described in FIGS. 8 and 9 may advantageously be applied to the apparatus illustrated in FIG. 1 or to that shown in FIG. 4.

It will be understood that the configurations set forth make it possible, if desired, to produce machines whose general geometrical axis is inclined by an adjustable angle with respect to the horizontal plane. This arrangement concerns solid materials treated in successive batches.

It is ascertained that the combination of the means and characteristics described, and in particular, the angle of inclination, and the mode of operation of the apparatus, produces new results which are principally due to the elimination of the "dead spaces" induced by the functional clearances inside the reactor.

These results come in particular from the combined action of the forces developed in operation by the reactor and by the components of the forces of gravity.

During the working phase of the reactor, the directions of the vectors of gravity and of mechanical drive are opposite. This guarantees the generation and control of the interfaces everywhere and prevents the substances from leaving during treatment.

On the other hand, during emptying, all the vectors act in the sense of complete extraction of the matter by changing the direction of rotation of one of the two working screws.

In summary, the present invention employs and conjugates, in order to obtain novel effects, the known arrangements of division and of recollation of the matter and the novel arrangements of screws with cylindrical-conical cores which, in particular, generate in space 2b an empty volume V, a large section of circulation of the gases in space 2b, a large section of the orifices for access of the gases, maintenance of the continuity of the maximum volume of the circulation of the gases and also of the solids and liquids, monitoring of this free section and self-cleaning of the system.

It must, moreover, be understood that the foregoing description has been given only by way of example and that it in no way limits the domain of the invention which would not be exceeded by replacing the details of execution described by any equivalents. In particular, it will be readily understood that the means for generating an additional free space (without dead space) allowing the introduction and extraction of gas during treatment in the apparatus according to the invention, may be constituted by an additional chamber increasing the volume of the bore of one of the two screws without any of them comprising a cylindrical-conical core.

I claim:

1. An apparatus for the physicochemical treatment and reaction of material comprising: a sleeve having at least two generally parallel bores formed therein, a first screw means rotatably mounted within a first of said bores and a second screw means mounted within a second of said bores, said first screw means having first and second core portions with at least said second core portion being generally conical and tapering inwardly to said first core portion, said second screw means having first and second core portions with said first core portion of said second screw means being generally conical in configuration tapering inwardly to said second core portion of said second screw means which is generally cylindrical and extends from said first core portion of said second screw means, a first open slot between said first core portion of said first screw means and said first core portion of said second screw means and a second open slot between said second core portion of said first screw means and said second core portion of said second screw means, a material inlet opening through said sleeve communicating with one of said bores, each of said first and second screw means having a generally continuous thread extending outwardly from said first and second core portions thereof to thereby define a plurality of spaces in which material introduced into said one of said bores through said inlet opening is conveyed, said spaces along the second core portion of said second screw means having a combined volume greater than the combined volume of each of said spaces along said first core portion of said second screw means, said first core portion of said first screw means and second core portion of the first screw means, respectively, so that only a portion of the combined volume of said spaces along said second core portion of said second screw means contains material being conveyed so that an air space is created along said spaces along said second core portion of said second screw means and wherein material within said spaces of said first core portion of said second screw means is redirected by said first core portion of said second screw means through said first open slot to said first and second core portions of said first screw means, and a gas first orifice through said sleeve communicating with said spaces along said second core portion of said second screw means so that said air space is maintained in said spaces along said second core portion second screw means to facilitate contact of a gas passing through said first gas orifice with material being conveyed along said spaces of said second core portion of said second screw means.

2. The apparatus of claim 1 in which said first core portion of said first screw means is also generally conically shaped tapering inwardly towards said second core portion.

3. The apparatus of claim 2 in which said inlet opening is positioned through said sleeve so as to introduce material between said first and second core portions of said first screw means.

4. The apparatus of claim 3 including valve means for selectively regulating an opening size of said first and second open slots between said first and second bores.

5. The apparatus of claim 3 in which said second core portion of said second screw means is greater in length than said second core portion of said first screw means, and said first gas orifice being spaced remotely from said second open slot.

6. The apparatus of claim 3 including a discharge outlet in said sleeve communicating with said second bore adjacent to said first core portion of said second screw means.

7. The apparatus of claim 1 in which said first core portion of said first screw means is generally cylindrical.

8. The apparatus of claim 7 in which said second core portion of said second screw means is greater in length than said second core portion of said first screw means, and said first gas orifice being spaced remotely from said second open slot.

9. The apparatus of claim 8 including a discharge outlet in said sleeve spaced remotely from said inlet opening, said discharge outlet communicating with said second bore adjacent to said first core portion of said second screw means.

10. The apparatus of claim 8 including valve means for selecting regulating a size of opening of said first and second slots.

11. The apparatus of claim 1 in which said first core portion of said first screw means is generally cylindrical and said inlet opening communicating with said first screw means along said first core portion thereof.

12. The apparatus of claim 11 including a discharge outlet in said sleeve spaced remotely from said inlet opening, said discharge outlet communicating with said second bore adjacent to said first core portion of said second screw means.

13. The apparatus of claim 2 including a third bore in said sleeve extending generally parallel to said first and second bores, said third bore being spaced on an opposite side of said first bore from said second bore, a third screw means mounted within said third bore and having first and second core portions with said first core portion of said third screw means being generally conical in configuration and tapering inwardly towards said second core portion of said third screw means, said third screw means having a generally continuous thread defining a plurality of spaces in which material is conveyed, each of said spaces defined by said second core portion of said third screw means being in open communication through a third open slot with said spaces defined by said second core portion of said first screw means, said spaces defined by said second core portion of said third screw means defining a combined volume which is greater than a combined volume of said spaces defined by said first core portion of said third screw means, of said spaces defined by said first core portion of said first screw means, and of said spaces defined by said second core portion of said first screw means, respectively, and said spaces defined by said first core portion of said third screw means communicating through a fourth open slot with said spaces defined by said first core portion of said first screw means, whereby a portion of said material introduced into said inlet opening is conveyed through said first and third bores in such a manner that an air space is created within said spaces defined by said second core portion of said third screw means.

14. The apparatus of claim 13 in which said inlet opening is between said first and second core portions of said first screw means, and a discharge opening communicating with one of said first core portions of said second and third screw means.

15. The apparatus of claim 13 in which said second core portion of each of said second and third screw means is greater in length than said second core portion of said first screw means, a second gas orifice into said third bore communicating with said spaces of said second core portion of said third screw means, and said first gas orifice and said second gas orifice being spaced remotely from said second and third open slots, respectively.

16. The apparatus of claim 2 including a discharge opening communicating with said second core portion of said second screw means through said sleeve, and a third screw means mounted within said second bore in intermeshing relationship with said second screw means.

17. The apparatus of claim 16 including a differential means connected between said second and third screw means for rotating said second and third screw means so as to allow a shift in a relative phase of rotation of said second and third screw means.

* * * * *